Inventor:
René Louis Rougemont
By Owen W. Kennedy
Attorney

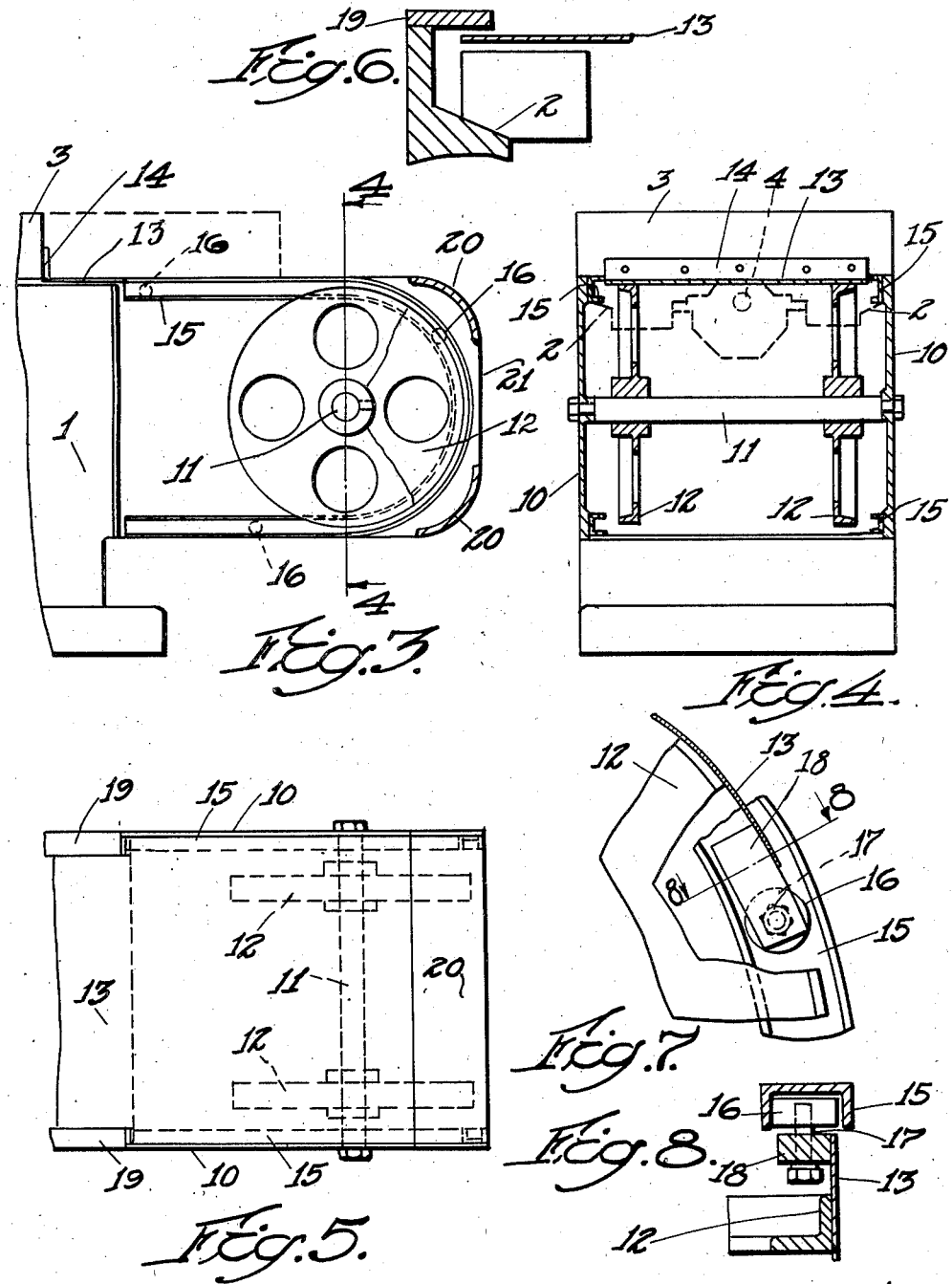

Patented Nov. 11, 1947

2,430,827

UNITED STATES PATENT OFFICE 2,430,827

AUTOMATIC WAY GUARD FOR MACHINE TOOLS

René Louis Rougemont, Worcester, Mass., assignor to Reed-Prentice Corporation, Worcester, Mass., a corporation of Massachusetts Original application April 10, 1942, Serial No. 438,422. Divided and this application October 2, 1943, Serial No. 504,747

3 Claims. (Cl. 308—3.5)

1

The present application relates to way guards for machine tools and is a division of my original application Serial No. 438,422, filed jointly with James B. Wilson on April 10, 1942, for a Milling machine, now Patent Number 2,384,133, issued September 4, 1945.

The device of the present application has for its object to provide an improved arrangement for automatically protecting the ways of a milling or like machine tool having a reciprocating table from the deposit of work chips and cuttings, in any position of the work support. The above and other advantageous features of the invention will hereinafter more fully appear from the following description considered in connection with the accompanying drawings, in which—

Fig. 3 is a view partially in front elevation and partially in section, showing the way guard construction at one end of the machine of Fig. 1, on an enlarged scale.

Fig. 4 is a vertical sectional view along the line 4—4 of Fig. 3, looking in the direction of the arrows.

Fig. 5 is a plan view of the parts shown in Fig. 3.

Fig. 6 is a fragmentary sectional view, showing the relation between one work table way and its associated guard.

Fig. 7 is a fragmentary view, on an enlarged scale, showing the relation between the end of a way guard and its track.

Fig. 8 is a sectional view along the line 8—8 of Fig. 7, looking in the direction of the arrows.

Like reference characters refer to like parts in the different figures.

Figure 1:
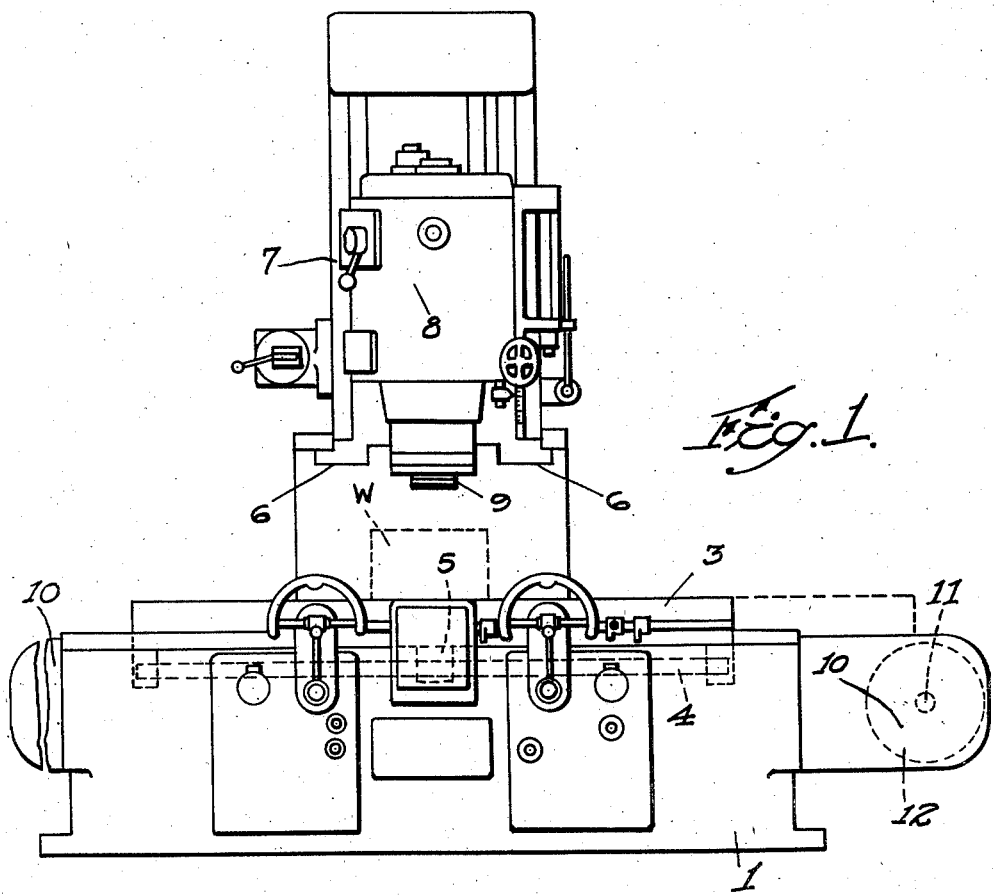
Fig. 1 is a view in front elevation of a machine tool embodying the invention.
Figure 2:
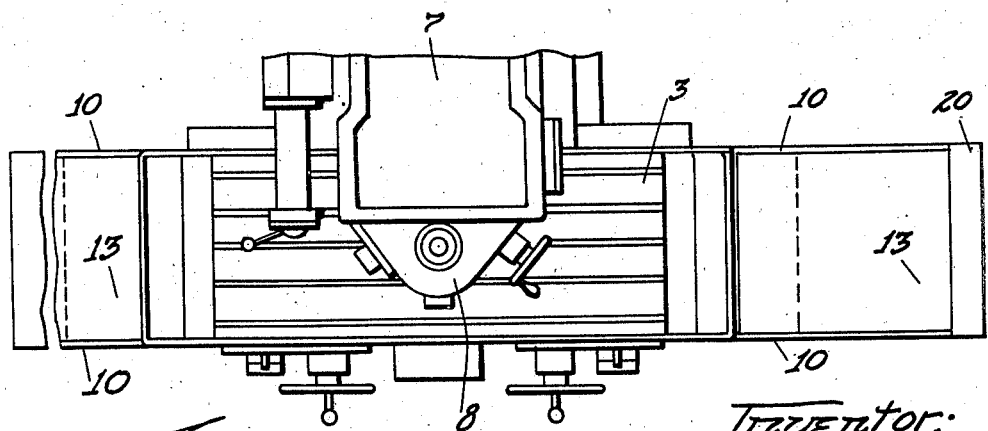
Fig. 2 is a plan view of the machine shown in Fig. 1.

Referring now to Figs. 1, 2 and 4, the invention is shown for purposes of illustration as being embodied in a milling machine comprising a bed 1, upon which is formed spaced horizontal ways 2 for slidably supporting and guiding a work table 3. The table 3 is adapted to have a reciprocatory movement imparted thereto on the ways 2 by means of a rotatably driven shaft 4, movable with the table and cooperating with a nut 5 carried by the bed 1, as indicated in dotted lines.

The bed 1 also provides spaced ways 6 extending at right angles to and above the table ways 2, and a cross slide 7 movable back and forth on the ways 6 carries a vertically movable tool head 8. The tool head 8 provides a tool spindle 9 for mounting a suitable tool to perform a machining

2 operation on work W carried by the table 3, indicated in dotted lines. The essential elements of the milling machine described thus far are usual in machines of this character, and the present invention has to do with the provision of an improved arrangement for automatically guarding the horizontal ways 2 against the deposit of chips and cuttings from the work W in any position of the table 3 on the ways 2.

Referring now to Figs. 3 to 6 inclusive, each end of bed 1 provides a pair of spaced side plates 10, with the plates extending beyond the bed a distance greater than the normal over-travel of the bed 1 with respect to the ways 2 in either extreme position of the table 3. As best shown in Fig. 4, each pair of plates 10 supports between them a transverse shaft 11 on which is mounted a pair of reels 12. The reels 12 are of such diameter as to support a guard 13 of sheet metal above the level of the ways 2, with one end of the guard being attached to one end of the table by means of a cross member 14. The guard 13 is of such thickness that it readily flexes around the reels 12, and the guard is of such length that it extends partially around the reels as shown in Fig. 3, when the table 3 occupies the middle position of Fig. 1.

Each side plate 10 is provided with a guide or track 15, bent in U-form, so as to substantially correspond to the periphery of the adjacent reel 12. Each track 15 is of channel section, so as to receive rollers 16 carried at the free end of the guard 13. As best shown in Figs. 7 and 8, each roller 16 is rotatably mounted on a stud 17 carried by a lug 18 attached to the under side of the guard 13. Therefore, the guard is guided at its free end between the tracks 15, so that it will generally conform to the peripheries of the reels 12 as it moves with the table 3 between the extreme positions indicated by the dotted line showings of the rollers 16 in Fig. 3.

It is apparent from a consideration of Figs. 5 and 8, that the guard 13 is of such width that its longitudinal edges clear the tracks 15, so that when the table 3 moves to the left from the position of Fig. 1, the guard will move freely between the tracks and will readily follow the table. As the guard 13 follows the left-hand movement of the table, it will completely cover the ways 2, that would be otherwise exposed. The guard 13 is of such length that it can follow the table to its extreme left-hand position, at which time the rollers 16 will have moved to substantially the upper ends of the tracks 15, as indicated in dotted lines in Fig. 3. It is to be noted that as the guard 13 moves over the ways 2, its marginal portions slide beneath a pair of covers 19 that are flush with the ends of the tracks 15, as indicated in fragmentary showing of Fig. 6. That is to say, the covers 19 abut the ends of the tracks 15, where the side plates 10 are connected to the machine bed 1, see Fig. 5.

In its movements with the table 3, the surface of the guard 13 is guided at all times, either between the tracks 15 and on the reels 12, or between the way covers 19. In order to protect the end of the guard where it passes around the reels 12, the side plates 10 are connected by cross members 20 extending close to the peripheries of the reels, which members 20 support between them a cover 21, which also extends beneath the reels. In this way, the relatively flexible material of the guard 13 is protected against damage, and is maintained in a flat condition when it extends over the table ways 2.

Upon right-hand movement of the table 3 to the extreme position indicated in dotted lines in Fig. 1, the free end of the guard 13 is guided by the rollers 16 to the lower dotted line position of Fig. 3. Since, as previously pointed out, the above described mounting of a guard 13 is duplicated at the left-hand end of the bed 1, the right-hand movement of the table 3 to the dotted line position of Fig. 1 is accompanied by movement of the left-hand guard 13 to a position where it covers the ways 2 as they are exposed by the left-hand end of the table. As a result, the ways 2 are completely covered as the table 3 moves back and forth, with the ways always fully protected against damage in any position of the table and with the deposit of chips and cuttings from the work being effectively prevented.

I claim:

1. An automatic way guard for machine tools comprising in combination, a bed providing spaced horizontal ways, a work table movable longitudinally on said ways from one extreme position to another, an extension at one end of said bed providing spaced tracks having parallel straight portions above and below said ways, with an intermediate curved portion uniting said straight portions, a flexible guard member wide enough to cover both ways, secured at one end to said table, a curved guide member mounted between said tracks, and rollers mounted at the free end of said guard member, at either side, for sliding movement along said tracks as said guard member is carried back and forth with said table, said guard member covering both of said ways when said table occupies one extreme position with respect to said track, and being flexed within said table extension in accordance with the cooperation between said track portions and said guide member when said table occupies its other extreme position with respect to said tracks.

2. An automatic way guard for machine tools comprising in combination, a bed providing spaced horizontal ways, a work table movable longitudinally on said ways from one extreme position to another, an extension at one end of said bed providing spaced tracks having parallel straight portions above and below said ways, with an intermediate curved portion uniting said straight portions, a flexible guard member wide enough to cover both ways, secured at one end to said table and free at its other end, a reel supported for free rotation between said tracks, and rollers carried by the other free end of said guard at either side and cooperating with said tracks to guide the free end of said guard on to, partially around and off of said reel as said guard travels back and forth on said table.

3. An automatic way guard for machine tools comprising in combination, a bed providing spaced horizontal ways, a work table movable longitudinally on said ways, an extension at one end of said bed comprising spaced side members, a reel freely rotatable on a cross shaft extending between said side members, a flexible guard member wide enough to cover both ways secured at one end to said table, and means provided by the side members of said bed extension on opposite sides of said reel for guiding the free end of said guard member, first on to the top of said reel and then around the reel, as said guard member travels back and forth with said table.

RENÉ LOUIS ROUGEMONT.

REFERENCES CITED

The following references are of record in the file of this patent:

UNITED STATES PATENTS

| Number | Name | Date |
|---|---|---|
| 1,674,145 | Van Hamersveld | June 19, 1928 |
| 1,461,887 | Birhanzl | July 17, 1923 |
| 1,679,912 | Mondloch | Aug. 7, 1928 |
| 2,190,213 | Meyer | Feb. 13, 1940 |